US005889886A

United States Patent [19]
Mahoney

[11] Patent Number: 5,889,886
[45] Date of Patent: Mar. 30, 1999

[54] METHOD AND APPARATUS FOR DETECTING RUNNING TEXT IN AN IMAGE

[75] Inventor: James V. Mahoney, San Francisco, Calif.

[73] Assignee: Xerox Corporation, Stamford, Conn.

[21] Appl. No.: 563,479

[22] Filed: Nov. 28, 1995

[51] Int. Cl.⁶ ..................................................... G06K 9/36
[52] U.S. Cl. .......................................... 382/176; 382/173
[58] Field of Search ..................................... 382/173, 176, 382/180, 229; 358/462, 464, 467

[56] References Cited

U.S. PATENT DOCUMENTS

| 5,313,526 | 5/1994 | Cheong | 382/176 |
|---|---|---|---|
| 5,588,072 | 12/1996 | Wang | 382/176 |

OTHER PUBLICATIONS

James L. Fisher, Ph.D; "Logical Structure Descriptions of Segmented Document Images"; pp. 302–310.
Theo Pavlidis and Jiangyin Zhou; "Page Segmentation by White Streams"; pp. 945–953.
Rolf Ingold and Doga Armangil; "A Top–Down Document Analysis Method for Logical Structure Recognition"; pp. 41–49.
M. Armon Rahgozar, Zhigang Fan, and Emil V. Rainero; "Tabular Document Recognition"; SPIE vol. 2181 Document Recognition (1994); pp. 87–96.
Robert M. Haralick; *1994 IEEE Computer Society Conference on Computer Vision and Pattern Recognition*; "Document Image Understanding: Geometric and Logical Layout"; Jun. 21–23, 1994; pp. 385–390.
Lawrence O'Gorman; "The Document Spectrum for Bottom–Up Page Layout Analysis"; pp. 270–279.
Henry S. Baird; "Background Structure in Document Images". pp. 253–269.
A. Antonacopoulos and R.T. Ritchings; "Flexible Page Segmentation Using the Background"; pp. 339–344.
Surkha Chandran and Rangachar Kasturi; "Structural Recognition of Tabulated Data"; pp. 516–519.
Michael J. Chen; "High–Speed Inspection Architectures, Barcoding, and Character Recognition"; November 5–7, 1990; vol. 1384; pp. 285–292.
M. Armon Rahgozar; "A Graph–Based Table Recognition System"; pp. 1–18.

*Primary Examiner*—David K. Moore
*Assistant Examiner*—Stephen Brinich

[57] ABSTRACT

The present invention is a method and apparatus for analyzing image data, and more particularly for analyzing image data representing images containing text to partition the image into running and non-running text regions therein. The present invention utilizes characteristics of running text regions to identify such regions and to subsequently group all non-running text regions into related groups.

14 Claims, 10 Drawing Sheets

METHOD AND APPARATUS FOR DETECTING RUNNING TEXT IN AN IMAGE

This invention relates generally to techniques for analyzing image data, and more particularly to the analysis of image data representing images containing text to identify running and non-running text regions therein.

CROSS REFERENCE

The following related applications are hereby incorporated by reference for their teachings:

Application Ser. No. 08/158,053 for "Analyzing an Image or Other Data to Obtain a Stable Number of Groups," filed Nov. 24, 1993 by James V. Mahoney et al.; and Application Ser. No. 08/565,181 for a "Method for Classifying Non-Running Text in an Image," filed concurrently herewith by James V. Mahoney.

BACKGROUND AND SUMMARY OF THE INVENTION

The present invention is generally directed to techniques for analyzing image data, and more particularly to the analysis of image data representing images containing text to identify running and non-running text regions therein without assuming a specific page layout. The invention employs the characteristics of running text regions to distinguish them from non-running text regions in a page image. As the input of the present invention, there is assumed to be digital representation of a hardcopy document that contains text regions. In addition, the image will have been processed by any one of a number of well-know processes for segmenting text regions in an image, and identifying the boundaries of such regions. While it is understood that such boundaries may be represented by a polynomial, it will be assumed that such boundaries are rectangular in shape for purposes of simplifying the description of the instant invention.

This invention presents a geometric, bottom-up method for partitioning a scanned page into two kinds of regions: (i) regions encompassing running text, i.e., text formatted in paragraphs and columns; and (ii) regions encompassing text formatted in other layout structures, such as headings, lists, and tables. This partitioning supports classification of the non-running text regions and selective scanning for text recognition. For example, table detection, crucial for establishing reading order, is done by testing the non-running text regions for alignment relations.

Page layout analysis processes may be divided into two broad categories: geometric layout analysis and logical structure analysis (R. Haralick. Document image understanding: geometric and logical layout. *Proc. IEEE Conf. On Computer Vision and Pattern Recognition*, 1994: 385–390). Geometric layout analysis, also termed bottom-up analysis, extracts whatever structure can be inferred without reference to models of particular kinds of pages - e.g., letter, memo, title page, table, etc. Intuitively, this is the structure that would be apparent even to an illiterate person. Also, it is the structure common to pages of all kinds. Logical structure analysis classifies a given page within a repertoire of known layouts, and assigns functional interpretations to components of the page based on this classification. Geometric analysis is generally preliminary to logical structure analysis.

Bottom-up analysis schemes attempt to segment a page into homogeneous regions of text, line art (graphics), and photographs (halftone images), and then stop. This is normally taken to be the highest level of structure that can be established bottom-up. However, the present invention establishes that a yet higher level of structure can be extracted using a bottom-up analysis technique, and that this can benefit subsequent logical structure analysis.

Heretofore, a number of patents and publications have disclosed methods for segmenting images and the identification of structure therein, the relevant portions of which may be briefly summarized as follows:

Text block segmentation has been addressed by R. Haralick, "Document image understanding: geometric and logical layout," *Proc. IEEE Conf. On Computer Vision and Pattern Recognition*, 1994: 385–390. Component aggregation or clustering methods that assemble homogeneous regions from individual connected components subject to size similarity and proximity constraints were described by L. O'Gorman, "The document spectrum for bottom-up page layout analysis," *Advances in structural and syntactic pattern recognition*, Ed. H. Bunke, Singapore: World Scientific, 1992: 270–279. Background structure methods detect bands of white space (gutters) in the image and treat these as the boundaries of text blocks as described by H. S. Baird, "Background structure in document images," *Advances in structural and syntactic pattern recognition*, Ed. H. Bunke, Singapore: World Scientific, 1992: 253–269; T. Pavlidis and J. Zhou, "Page segmentation by white streams," *Proc. 1st Int. Conf. On Document Recognition*, Saint-Malo, 1991: 945–953; and A. Antonacopoulos and R. T. Ritchins, "Flexible page segmentation using the background," *Proc. 12th Int. Conf. On Pattern Recognition*, 1994: 339–344.

Top-down logical structure analysis processes do attempt to distinguish types of text, but do so using a priori layout models as taught, for example, by G. Nagy, S. Seth, and S. Stoddard, "Document analysis with an expert system," *Pattern Recognition in Practice II*, E. Gelsema and L. Kanal, editors, North Holland, Amsterdam, 1986: 149–159; and R. Ingold and D. Armangil, "A top-down document analysis method for logical structure recognition," *Proc. 1st Int. Conf. On Document recognition*, Saint-Malo, 1991: 41–49.

J. Fisher, in "Logical structure descriptions of segmented document images," *Proc. 1st Int. Conf. On Document recognition*, Saint-Malo, 1991: 302–310, describes a rule-based system that identifies geometrical and logical structures of document images. Location cues, format cues and textual cues (OCR) are employed to make identifications and transformations during the identification of text and non-text regions.

U.S. Pat. No. 5,239,596 to Mahoney, issued Aug. 24, 1993, incorporated herein by reference for its teachings, describes techniques for labeling pixels in an image based upon nearest neighbor attributes.

In accordance with the present invention, there is provided a method comprising: retrieving an input image, the image comprising an array of image signals and associated data defining a set of boundaries of a plurality of text-blocks represented therein, and storing the array of image signals in a bitmap array and the data defining the set of boundaries in a second array; partitioning the text-blocks defined by the set of boundaries stored in the second array into text groups; and classifying the text-groups to determine those text-groups which represent running text regions of the image and those which represent non-running text regions of the image.

In accordance with another aspect of the present invention, there is provided a method operating on a programmable computer for partitioning an image containing text into regions of running text and non-running text, the image consisting essentially of an array of image signals and associated data defining a set of boundaries of a plurality of text-blocks represented therein, said method comprising the steps of: retrieving an input image and storing image signals thereof in a first bitmap array memory location and the data defining the set of boundaries in a second memory location; partitioning the text-blocks defined by the boundaries stored in the second memory location into text groups; and classifying the text groups to determine those text groups which represent running text regions of the image and those which represent non-running text regions of the image.

In accordance with yet another aspect of the present invention, there is provided an apparatus, comprising: a first memory for storing image data; a second memory for storing data representing characteristics of an image, the bitmap data for said image being stored in said first memory array; instruction memory; a text processor, connected to said first and second memory and said instruction memory for accessing the data stored in the first and second memory in accordance with instructions stored in said instruction memory, the processor in executing the instructions: accessing the image data stored in the first memory location to produce text block boundaries representing text blocks in the image, the data defining the text block boundaries being stored in the second memory as image characteristic data; partitioning the text-blocks defined by the boundaries stored in the second memory location into text groups; and classifying the text-groups to determine those text-groups which represent running text regions of the image and those which represent non-running text regions of the image.

One aspect of the present invention deals with a basic problem in image recognition-that of applying structural norms in a top-down analysis. In top-down or logical structure analysis, a given page image is analyzed based upon functional interpretations of components of the page. In the more generalized geometric analysis techniques employed by the present invention, it is possible to extract a similar level of structure in a bottom-up approach. This aspect is further based on the discovery of a technique that alleviates this problem. The technique partitions a page image into two principal types of regions: running text and non-running text. The technique, using four separate analysis phases, detects text blocks, groups the text blocks, extracts text blocks that represent running text and regroups regions of contiguous, non-running text blocks, with the output representing a list or similar representation of running and non-running regions of the page image. Such output may be further processed to identify tabular regions in the non-running text.

The techniques employed in the present invention are advantageous to the analysis of a document (page image), because they provide important information about the layout structure of the page without the assumption of any specific page layout. Conventional top-down analysis techniques typically depend on such specific assumptions and, therefore, cannot be applied as generally. This invention has practical advantages in optical character recognition systems and may also be employed in document search and retrieval systems wherein a user might select a document category to focus the search. In the latter, the classification of a page image in accordance with the present invention would enable the document type to be accurately classified (e.g., memo, technical report, journal article, etc.). Accordingly, a wide variety of operations can be implemented using the output of these techniques.

BRIEF DESCRIPTION OF THE DRAWINGS

FIGS. 5, 6 and 7 are illustrative examples of a page image at various stages of processing in accordance with the present invention;

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims. In particular, the present invention is described in terms of processing a binary image. However, the techniques employed herein are suitable for application to other image types either by extension of the techniques described or by preprocessing of the image data, and there is no intent to limit the present invention to the binary is image embodiment employed herein for purposes of explanation.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low" or "true" and "false." A bit is an "inverse" of another bit if the two bits have different values. An N-bit item of data has one of $2^N$ values. The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal or data when it receives the first signal at one time and, in response, provides substantially the same signal or data at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium. "Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "text processor" or "processor" is any component or system that can process data, and may include one or more central processing units or other processing components that are responsive to programming instructions. A processor performs an operation or a function "automatically" when it performs the operation or function independent of concurrent human control.

Any two components are "connected" when there is a combination of circuitry that can transfer signals from one of the components to the other. For example, two components are "connected" by any combination of connections between them that permits transfer of signals from one of the components to the other.

A processor or other component of circuitry "uses" an item of data in performing an operation when the result of the operation depends on the value of the item. For example, the operation could perform a logic or arithmetic operation on the item or could use the item to access another item of data. To "obtain" or "produce" data is to perform any combination of operations that begins without the data and that results in the data. Data can be "obtained" or "produced" by any operations that result in the data. An item of data can be "obtained from" or "produced from" other items of data by operations that obtain or produce the item of data using the other items of data.

"Code" means data indicating instructions, but in a form that a processor can execute.

An "array of data" or "data array" or "array" is a combination of items of data that can be mapped into an array. A "two-dimensional array" is a data array whose items of data can be mapped into an array having two dimensions. An example is a two-dimensional array of bitmap image data for printing or display. An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An item of data is produced by "combining" other items of data when logical or numerical operations are performed on the other items of data that yield an item of data of the same type. For example, numbers indicating distance can be combined by adding, by calculating the mean or average, by selecting one of the distances, by taking the square root of the sum of squares, or by another similar operation.

An "image" is a pattern of physical light. An "image set" is a set of one or more images. An image may be divided into "segments" or "regions," each of which is itself an image. A segment of an image may be of any size up to and including the whole image. A "page image," as used herein, is a digitized representation of a single page of a document where the image is, for example, created by scanning the document page with an image input device. An item of data "defines" an image when the item of data includes sufficient information to produce the image. For example, a two-dimensional array can define all or any part of an image, with each item of data in the array providing a value indicating the color and/or intensity of a respective location of the image. Each location in an image may be called a "pixel." In an array defining an image in which each item of data provides a value, each value indicating the color of a location may is be called a "pixel value".

A "word" is a set of one or more characters that is treated as a semantic unit in a language. A "text" is a sequence of characters; the characters of a text may form words and other subsequences within the text. An image or an image set may "show" a version of a text, a word, an item in a table, a line of text, or another text item as well as other features such as graphics. "Character" means a discrete element that appears in a written or printed form of a language. Characters in the English language can thus include not only alphabetic and numerical elements, but also punctuation marks, diacritical marks, mathematical and logical symbols, and other elements used in written or printed English. More generally, characters can include, in addition to alphanumeric elements, phonetic, ideographic, or pictographic elements.

"Running text" is text which comprises the body matter of a document (e.g., a page or a book). "Non-running text," is that text within a document that is not part of the body matter and includes, for example, tables, headings, captions, and lists.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "connected component set" or "component set" is a set of connected components that are treated as a unit. A word, an item in a table, a line of text, a paragraph, or a page of text can therefore be a component set. A "bounding box" for a word or other component set is a rectangle just large enough to include all the pixels in the component set, and can be specified by coordinates. The method of this invention is equally applicable if the boundary of all the pixels in a component set is represented by a more complex shape (e.g., a polygon), since the information in a bounding box can be computed from any such bounding shape. Therefore, the term "bounding box," as used herein, will be understood to include any bounding shape from which a bounding box can be computed.

An "image input device" or an "image input terminal" (IIT) is circuitry for obtaining data defining images as input. An "image input device" is a device that can receive an image and provide an item of data defining a version of the image. A "scanner" is an image input device that receives an image by a scanning operation, such as by scanning a hardcopy document. An "image output device" or "image output terminal" (IOT) is circuitry for providing data defining images as output. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. A "printer" is an image output device that provides an output image in the form of marks on a marking medium.

Figure 1A:
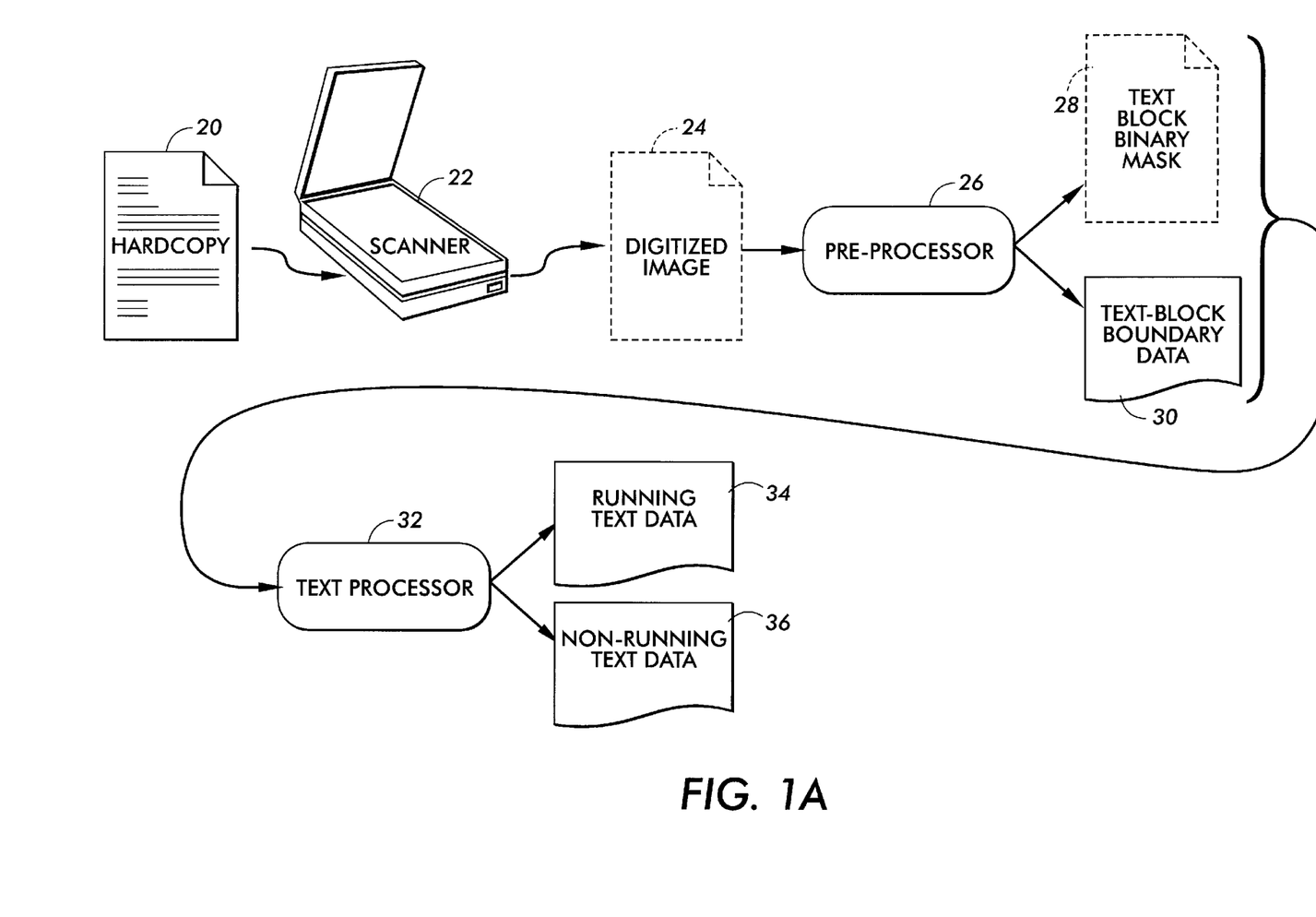
FIG. 1A is a data flow diagram of the present invention.

Referring now to FIG. 1A, there is illustrated a data flow diagram illustrating the basic operation of the present invention. In particular, a hardcopy document 20 is placed upon the platen of a scanner or similar image input terminal 22 to generate a digitized (e.g., binary) representation or page image 24 thereof. An exemplary representation of a digitized image is depicted in FIG. 5. In a preferred embodiment, page image 24 is stored, at least temporarily on a data storage medium or device (not shown) before subsequent processing by pre-processor 26. The output of pre-processor 26 is two-fold: a binary mask image 28 or similar binary data array representing the pixels of the text blocks in the input image; and text-block data 30, preferably in the form of a record or similar regularly structured data array. The binary mask image and text-block data are also temporarily stored before being transferred to text processor 32 for further processing. In text processor 32, the input image and text-block data is analyzed in three general phases in accordance with the present invention. First, the text-blocks are grouped into text groups based upon similarity in width. Next text groups that correspond to running text columns are extracted by testing for characteristic spatial relations therebetween, leaving only the non-running text groups. Finally, contiguous regions are formed from the non-running text groups and boundaries about the contiguous regions are defined. The output of text processor 32 is data reflecting the boundaries of the running text and non-running text regions, data records 34 and 36, respectively.

Figure 1B:
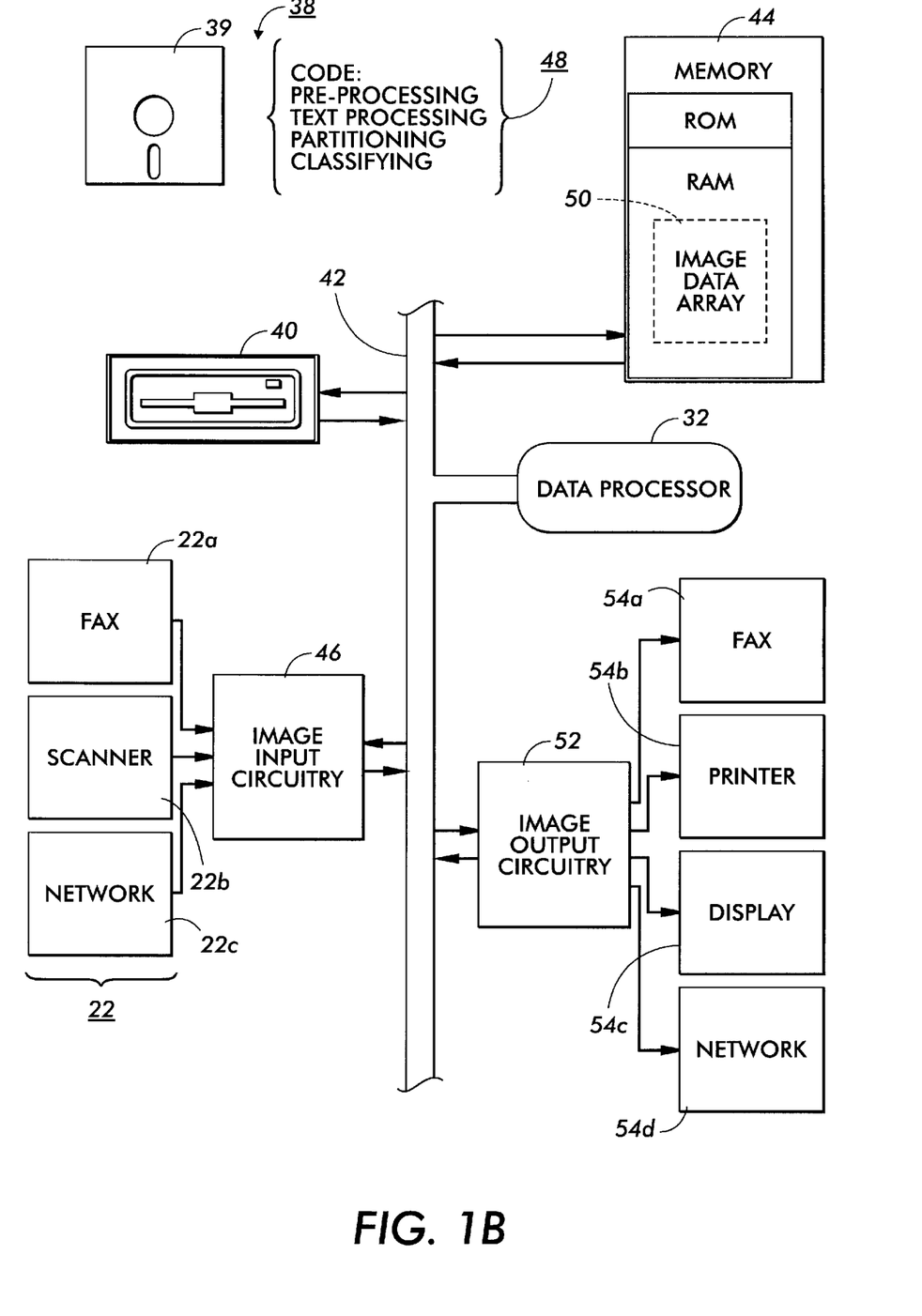
FIG. 1B is a schematic block diagram showing general components of a machine on which the method of the present invention may be employed to implement the functionality generally depicted in FIG. 1A.

As illustrated in FIG. 1B, text processor 32 may be a device suitable for executing code associated with a software product 38, an article of manufacture that can be used in a system that includes components like those shown in FIG. 1B. Software product 38 includes storage medium 39 that can be accessed by access device 40. The storage medium 39 may, for example, be a magnetic medium such as the diskette illustrated, an optical medium such as a CD ROM, or any other appropriate medium for storing data. Storage medium 39 stores data that access device 40 can provide to data processor 32 via a bus 42 or similar connection. Processor 32 is connected for accessing memory 44, which can include program memory (ROM and RAM) storing data indicating instructions that processor 32 can execute and also data memory (RAM) storing data that processor 32 can access in executing the instructions.

Processor 32 is also connected for receiving data defining images from image input circuitry 46 which connects image input terminal (IIT) 22 to processor 32 via bus 42. The page image data could be obtained from scanner 22a, from facsimile (fax) machine 22b, from network 22c, which could be a local to area network or other network capable of transmitting data defining an image or from other interactive imaging devices. In addition to storage medium 39, software product 38 includes code instructions 48, which processor 32 can execute to perform operations such as those depicted in the flowcharts of FIGS. 3 and 4. In executing instructions 48, processor 32 employs page image data from image input circuitry 46 for analysis as will be described subsequently. Image data 50 may be received from the IIT and stored as array data in memory 44. In addition, array data 50 could be obtained by operating on data defining an input image received the IIT, and more than a single array of data (50) may be maintained in memory 44 at any particular instant in time. Processor 32 uses the image data to obtain data indicating characteristics of the running and non-running text regions in the image data as will be described.

Processor 32 can also be connected for providing data defining images to image output circuitry 52. For example, software product 38 could include data indicating instructions that processor 32 can execute to obtain image data defining an output image. The output image data could be provided to image output circuitry 52, and could in turn be provided to fax machine 54a, to printer 54b, to display 54c, or to network 54d to produce images as depicted, for example, in FIG. 5.

With respect to the pre-processor 26, the pre-processor is any suitable processor, such as processor 32, and preferably implements any one of a number of well-known text-block segmentation processes. The output thereof is a set of connected components or "blobs" which preferably encompass a single running text paragraph. It will be further appreciated that such a process can be based upon size similarity and spatial proximity of individual connected components (i.e., characters) alone. Because it is a bottom-up process, the result may also encompass some non-running text regions or fragments thereof. In a preferred embodiment, the text block segmentation process is based on standard mathematical morphology methods used for finding text blocks in optical character recognition systems, as discussed by R. Haralick, in "Document image understanding: geometric and logical layout," *Proc. IEEE Conf. On Computer Vision and Pattern Recognition*, 1994: 385–390. The text block segmentation process may be similar to that employed in the software product Text-Bridge™ produced by Xerox Imaging Systems during the processing of blocks of text within an image so as to perform optical character recognition.

Figure 2:
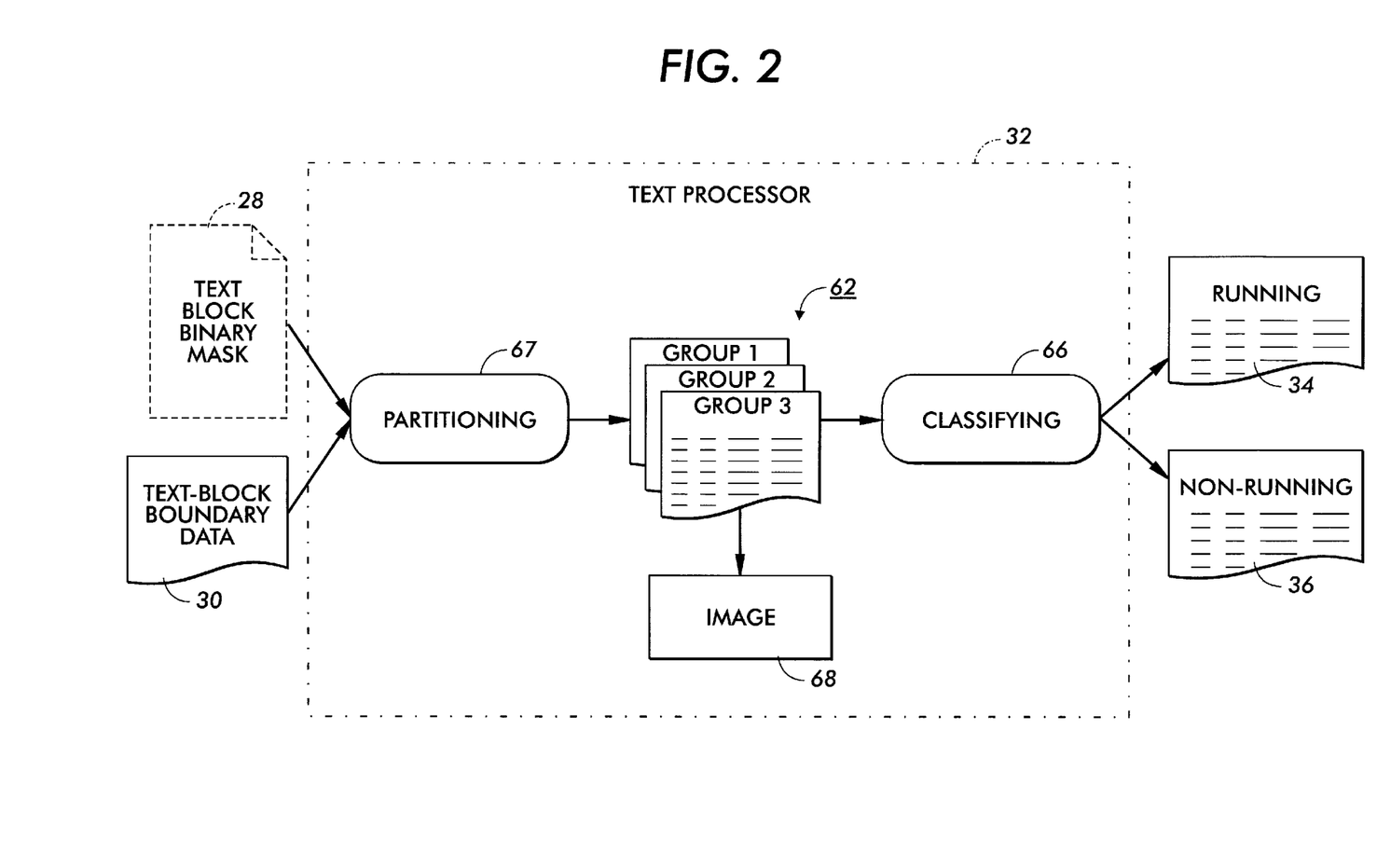
FIG. 2 is a block diagram of the principal text processing operations performed in accordance with the present invention.

In the following description, the invention generally described above will be further defined with respect to the two operational blocks depicted in FIG. 2. Referring now to FIG. 2, depicted therein are the operations carried out by the text processor 32 of the present invention. Text processor 32 is preferably a data processing system or similarly configured computing device capable of operating in response to preprogrammed instructions or code. In particular, text processor 32 may be a programmable workstation suitable for running one or more processing operations in a window-like environment, such as a SPARCStation™ 20. Referring to FIG. 2 in conjunction with FIG. 1, it is apparent that the operation of text processor 32 transforms the input data, in the form of a binary image 28 and text block boundaries 30, into two sets of data or records 34 and 36, respectively associated with the running and non-running text groups.

Figure 6:
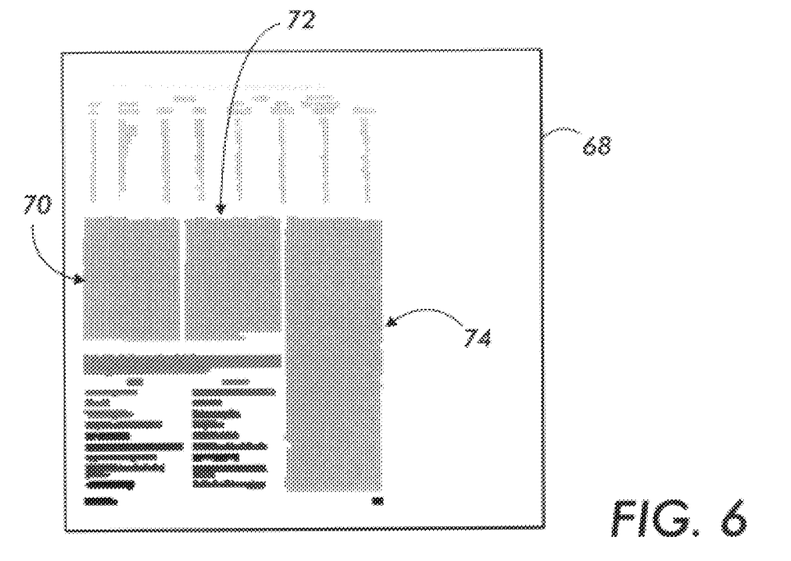

The text processor 32 first performs a partitioning operation 60 wherein the text blocks are grouped or "partitioned" into text groups 62 based upon a similarity in their horizontal width. An exemplary figure 68, illustrating a grouping of the text groups can be found in FIG. 6. In FIG. 6, the text blocks associated with a particular group are depicted by various cross-hatching/shading styles. For example, regions 70, 72 and 74 are similarly shaded and would be reflected in the data 52 as being associated with a common text group such as Group 1. As depicted in FIG. 2, the data reflected by image 68 represents the information in a manner equivalent to the record information depicted by reference numeral 62.

Continuing with FIG. 2, the text group data is then processed by a classifying operation 66. Operation 66 is a two-part operation that first extracts the text groups having running text therein and subsequently places the non-running text groups into contiguous regions and defines the boundaries about such regions. Once again, the output of the classifying operation is represented by data reflecting the boundaries of the running text and non-running text regions, records 34 and 36, respectively.

Figure 3:
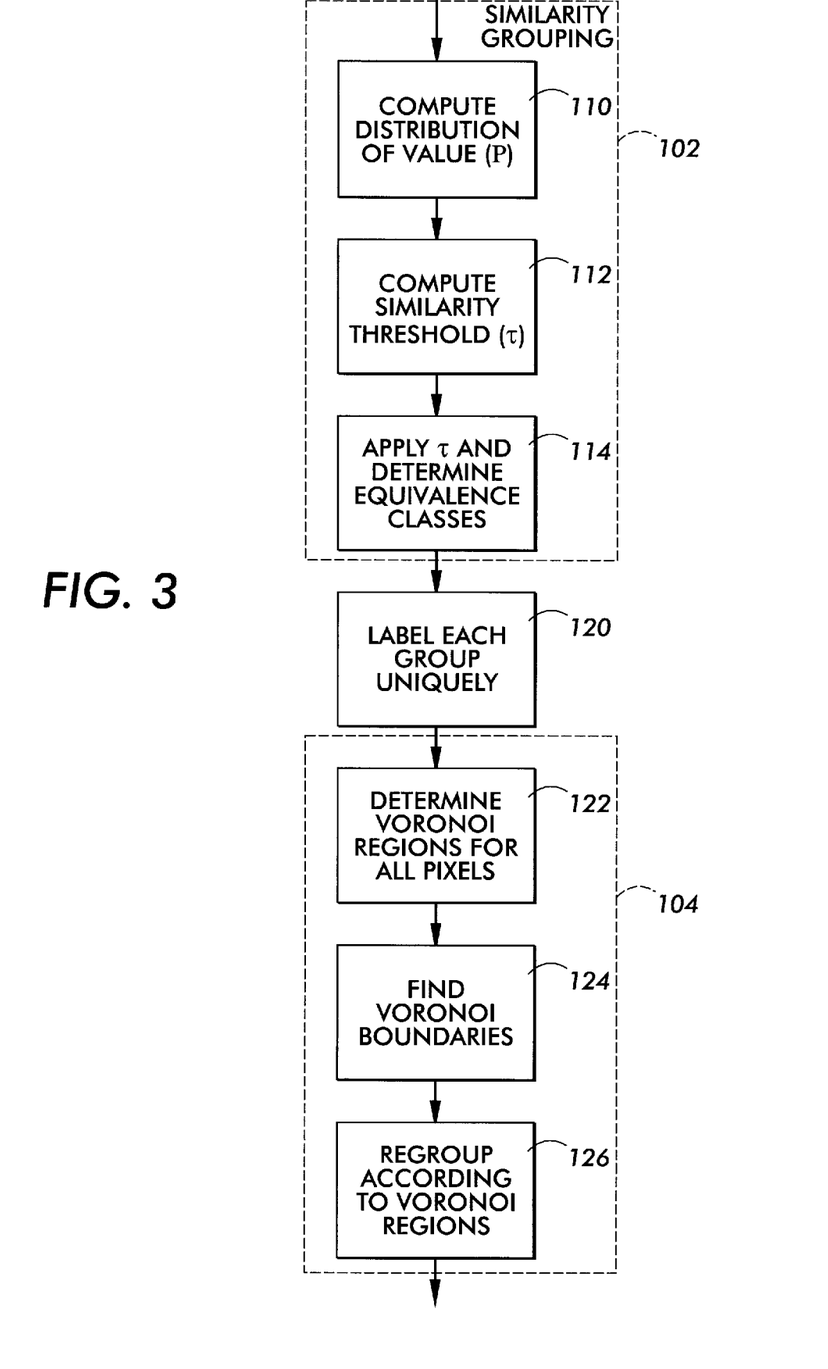
FIG. 3 is a flowchart depicting the various operations performed in the partitioning block of FIG. 2.

Turning now to FIG. 3, the functionality of the partitioning operation block of FIG. 2 will be described in detail with reference to a flowchart. Although depicted as such, the flowchart is intended only to be a representation of the steps completed by the text processor in response to executable commands. It will be appreciated by those skilled in the art of computer programming that numerous alternatives to the steps described herein may be deemed to be equivalent to the process steps of the present invention.

The column structure of a page image is defined by the widths and spatial arrangement of the running text paragraphs. Paragraphs in the same column or sequence of columns are typeset to a common width so that they give rise to text blocks that are highly similar in width. Non-running text blocks, on the other hand, are usually not similar in width to each other or the paragraph text blocks. Hence, similarity in width may be employed to discriminate, to a certain degree, between running and non-running text blocks. The partitioning operation of the present invention partitions the set of text blocks into subsets referred to as text groups, based upon similarity in width. The partitioning is accomplished using a sufficient stability grouping method as will be described with respect to the similarity grouping portion 102 of the flowchart depicted in FIG. 3. The groupings are further refined by enforcing contiguity or neighboring relationships as represented by portion 104 of the flowchart.

Briefly, given a property P of some unit - text blocks - a similarity grouping is a partitioning of the units into equivalence classes, and a group comprises one of the classes. In order to accomplish the similarity grouping, a similarity threshold $\tau$ of the differences in P (step 110) is computed, step 112. Next, in step 114, the equivalence classes of elements are defined by applying the threshold $\tau$ in a transitive closure operation such that two objects are placed in the same group if their values for P differ by less than $\tau$. The mapping from the difference in P (denoted by t) to groupings (denoted by G) is generally a step function. That is, as $\tau$ varies from zero to infinity, not every change in $\tau$ affects the result. Initially, for very low $\tau$, each unit is a singleton, while for very large $\tau$ only a single group exists.

Stability grouping is a general heuristic criterion for choosing $\tau$ as a function of the relative persistence of each distinct grouping in an evolution from a small to a large $\tau$ value. The measure of the stability of the grouping is the "length" of the interval of t over which it persists. Given a desired degree of stability, an associated value of $\tau$ may be determined by calculation, based directly on the distribution of the values of P, without computing any groupings. Since $\tau$ is essentially a threshold on the "gaps" between consecutive values of P, the groupings only change when $\tau$ exactly matches a gap. Therefore, the stability measures of all groupings are determined by: (a) computing and sorting the gaps, and (b) determining the differences between consecutive gaps. Such a computation may be accomplished using arithmetic operations on sequences or linear arrays. As taught by Mahoney et al. in Application Ser. No. 08/158,053 for "Analyzing an Image or Other Data to Obtain a Stable Number of Groups," filed Nov. 24, 1993, hereby incorporated by reference for its teachings, a maximum stability criterion produces the grouping with the maximal stability measure (i.e., $\tau$ is a value of t in the widest constant interval of G). The present invention, on the other hand, employs a "sufficient stability criterion" for $\tau$ that selects the first value for $\tau$ for which a given incremental change does not affect the number of groups. In one embodiment, the allowed increment may be set to 1; $\tau$ is then the smallest value of t in the first interval of G having a length greater than 1.

Figure 7:
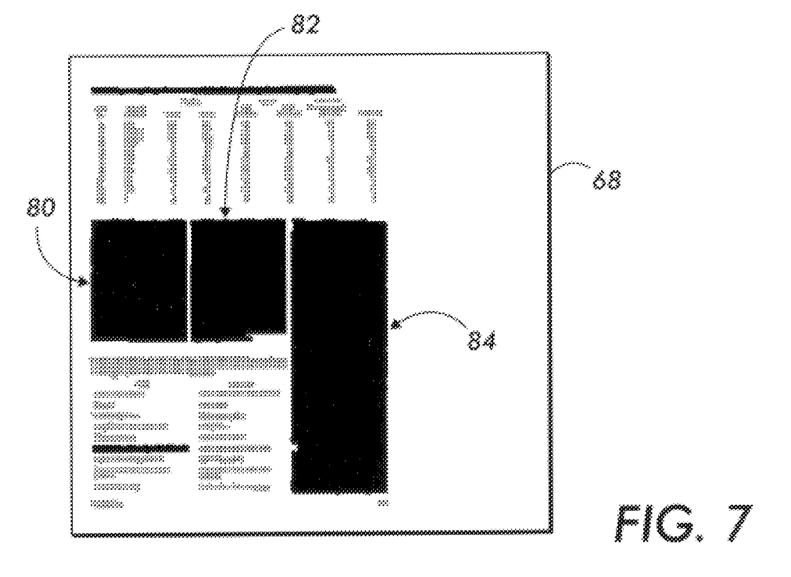

The grouping scheme depicted in section 102 of FIG. 3 may be characterized as a global scheme; it will group two width-similar text blocks together regardless of their positional relationship. The scheme is insensitive to neighboring relationships that, in human perception, would affect whether the two blocks are related or not. As an example, the page image 68 illustrated in FIG. 7 shows three regions 80, 82 and 84 which appear to represent columns of running text. However, there is also a smaller text block 86 that has a width similar to that of the other three regions. Similarity grouping, as described above, would add the single text line block 86 to the group consisting of text blocks 80, 82 and 84. However, text line 86 is not appropriately added to the running text group as it appears to represent a single text line such as a caption or table entry. Hence, the contiguity enforcement portion 104 of the flowchart in FIG. 3 is necessary to further refine the groupings.

Figure 8A:
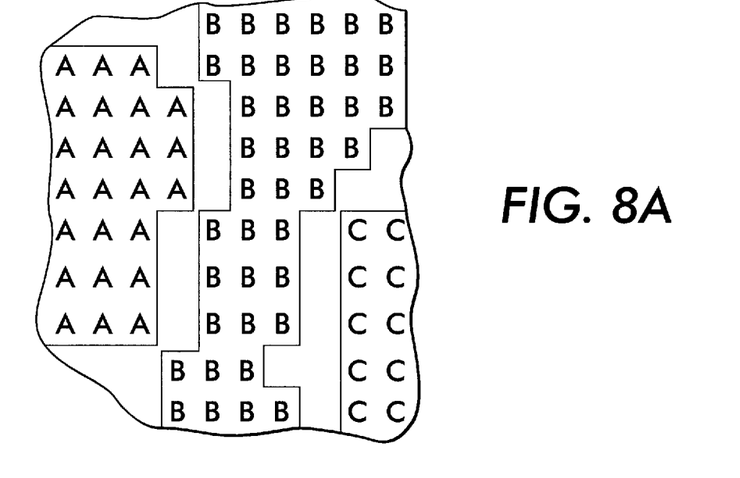
FIGS. 8A and 8B are highly magnified representations of a portion of an array of image pixels.

Contiguity is enforced, in accordance with the present invention, by assuring that all elements of a group are spatially contiguous. In a preferred embodiment, this may be accomplished by imposing Voronoi adjacency constraints on the groupings. Alternatively, any approach capable of characterizing the adjacency relationships between bounding boxes may be employed. The following is a description of how a Voronoi adjacency constraint would be imposed on the groups determined by the similarity grouping steps. It will be appreciated that alternative steps may be employed to accomplish the same general operations described here. Initially, at step 120, each group of text blocks is labeled with a unique identifier. More specifically, each pixel of a text block, b, is labeled with the unique identifier for the group, g, to which it belongs as illustrated by FIG. 8A. Depicted therein are three different text blocks representing groups A, B and C, with the pixels in each labeled as such.

Figure 8B:
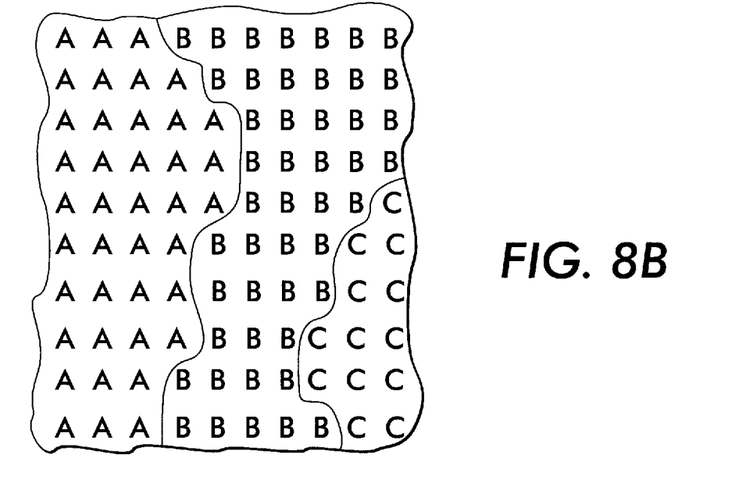
Figure 9:
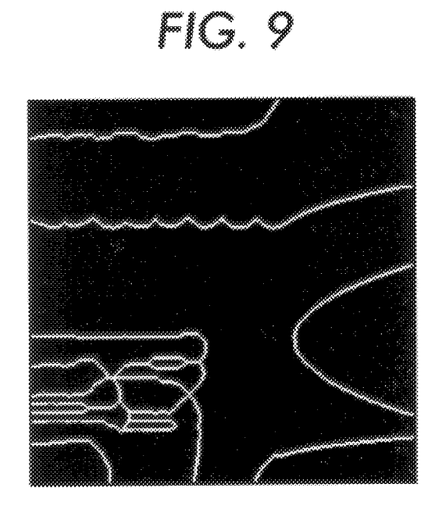
FIGS. 9–12 are additional illustrative examples of a page image at various stages of processing in accordance with the present invention.
Figure 10:
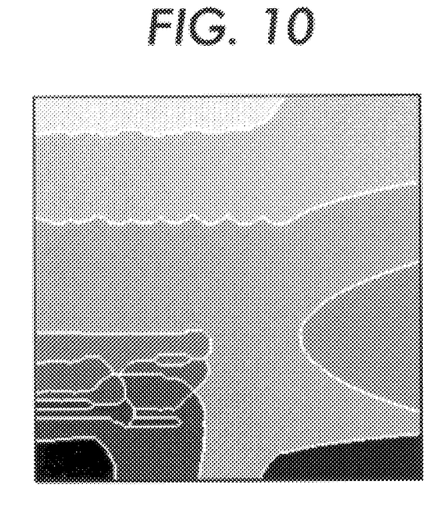
Figure 11:
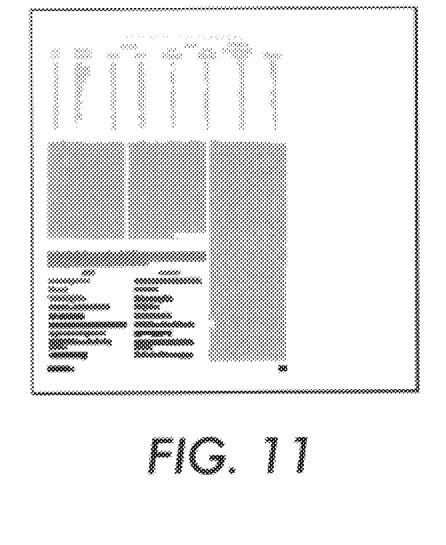

Generally, pixel p is in the Voronoi region of group g if the nearest black pixel to p has the label of g. p is assigned the label of g. An example of an image segment with three Voronoi regions is illustrated in FIG. 8B. A further example of the Voronoi regions of the image of FIG. 5 is shown in FIG. 9. As illustrated by FIGS. 8B and 9, the pixels closest to a text group are identified with the unique "letter" assigned to that group. As illustrated in the flowchart of FIG. 3, the Voronoi regions are determined for all pixels within the page image, step 122. Consider then the complement C of the set of locations that are on the boundary of any of the Voronoi regions (e.g., equidistant from black pixels in at least two text groups) as represented by step 124. Each connected region c in C is labeled uniquely and the label of c is assigned to each text block that c includes (see FIG. 10). As represented by step 126, then, sets of text blocks (groups) with the same label then comprise new text groups that are spatially contiguous subsets of the original groups; represented in the flowchart by step 126 and as illustrated in FIG. 11 for the page image of FIG. 5. The output of the steps illustrated in the FIG. 3 flowchart, or by partitioning operation 50 of FIG. 2, is then the refined grouping of associated text blocks and the boundaries thereof. As will be appreciated, this information may be reflected in a data record or similar structure stored in a memory of the processing system for transfer to the subsequent classifying operation.

The text blocks corresponding to a paragraph in a given column or sequence of columns also reflect dependable layout conventions. Generally, such paragraphs are left-aligned within the same column and are separated by relatively small gaps between adjacent columns. These layout constraints help discriminate between running and non-running text groups. Generally, it is expected that a text group comprising running text will exhibit two characteristics. First, the text group should occupy nearly the entire horizontal extent of text on the page. Second, gaps between adjacent columns should be narrow compared to the width of a column's paragraphs. The use of the above constraints to characterize or classify the text groupings previously identified is represented by operation 56 of FIG. 2 and is illustrated in detail in the flowchart of FIG. 4.

Figure 4:
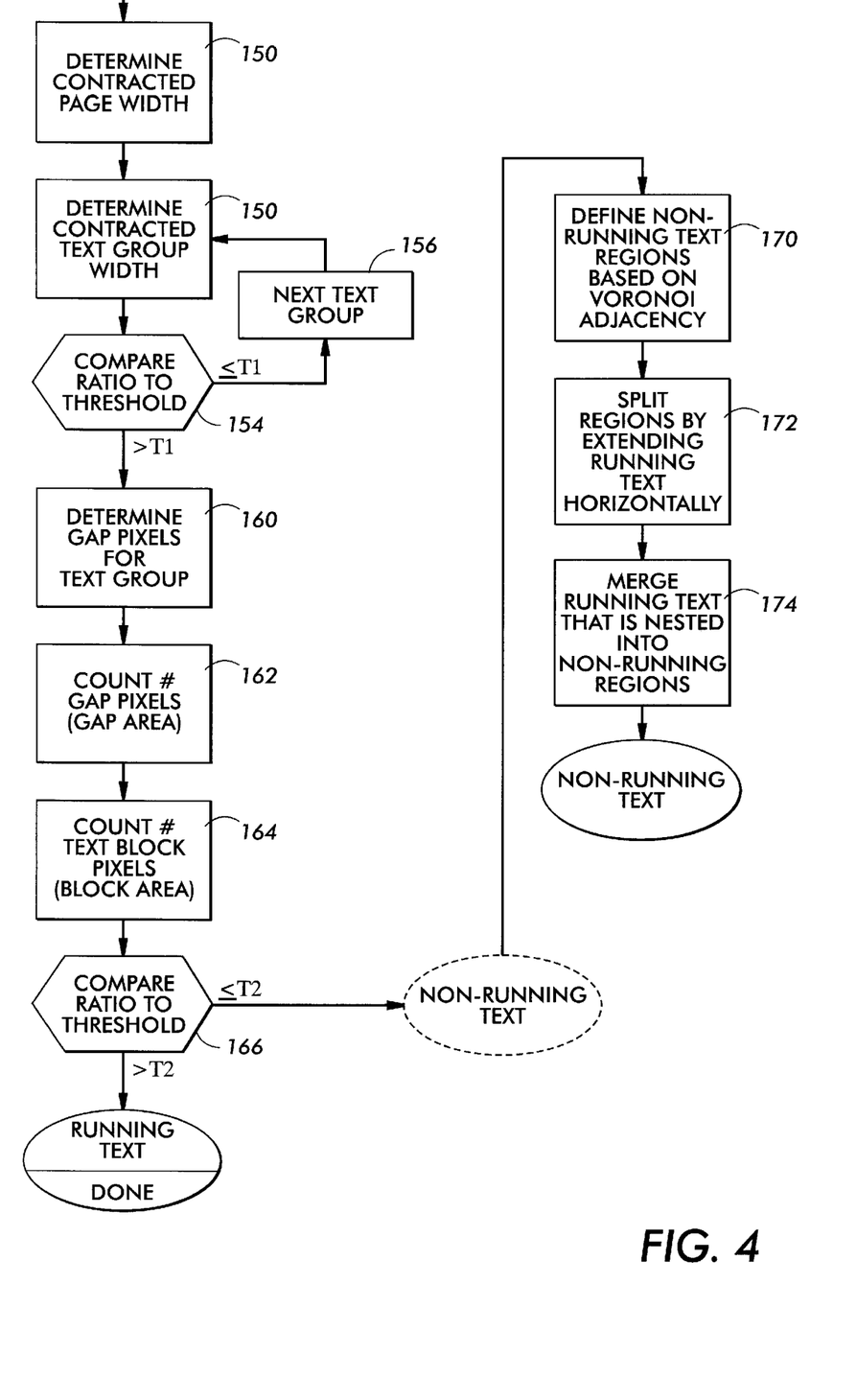
FIG. 4 is a flowchart depicting the various operations performed in the classifying block of FIG. 2.

Turning then to FIG. 4, depicted therein are the steps associated with classifying the text groups into running and non-running groups. The constraints and steps described below are specifically tailored so as to limit the effects of noise on the classification operation. For example, it is not possible to utilize the bounding box surrounding the text blocks to measure the width of the page because extraneous outlying black pixels could throw off the result. To allow for additive noise, the present invention utilizes a page width measure that ignores white-space. The measure for width is then the maximum number of black pixels in any pixel row across the page image and is depicted in FIG. 4 as step 150. Similarly, the measure of the width of a text group, g (step 152) also ignores white-space: it is the number of pixel columns across the page that include a black pixel of text block g. Notably, this measure also allows for text groups having text blocks therein with no vertical overlap. As used herein, the aforedescribed measures are referred to as contracted width measures to reflect their insensitivity to white spaces.

Subsequently, a ratio is formed from the contracted group width divided by the contracted page width and this ratio is compared against a threshold T1 at step 154. If the ratio is less than T1, the group is deemed to be non-running text, the next text group is selected at step 156, and the comparison repeated. If greater than T1, the text group may possibly be a region of running text and further analysis is continued subsequent to step 154. Preferably, threshold T1 is determined empirically, however, threshold values on the order of 0.75 could be successfully employed to practice the present invention. In an alternative embodiment, it may be preferable to filter the text blocks or page images to reduce or eliminate extraneous horizontal streaking that can impact the outcome of the width measurements. Generally, the filter employed in one embodiment erases or eliminates black pixels where there are relatively few black pixels on in the same Voronoi region and in the same pixel column. More specifically, a "height mask" is employed to mask out those black pixels having limited vertical extents. Consider a group pixel column as the set of black pixels in a given text group g that are also in the same pixel column (same x coordinate). Each black pixel is labeled with the number of pixels in its group pixel column. The mode (most common value) of the pixel labels is obtained for each group g. A text block pixel then remains on in the height mask if its label is large enough relative to the modal value (e.g., greater than about 33% of the modal value) in the group to which it belongs. Subsequently, it is the height mask that is employed to accomplish the previously described contracted measures.

Figure 12:
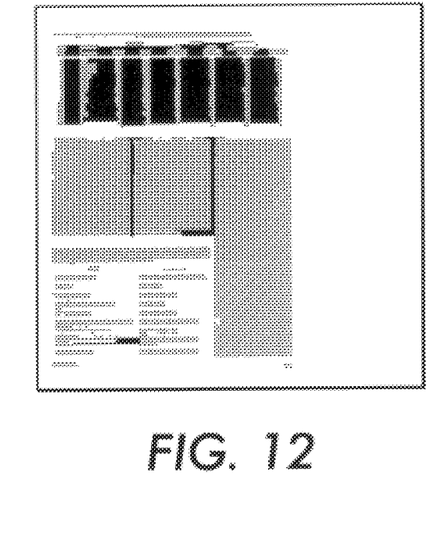

Continuing with FIG. 4, the second constraint used to identify running text groups is gap area. Generally, a gap pixel of a text group, g, is a white pixel that has a black pixel of a text block in g both in the left and right horizontal directions and in the same pixel row or raster in the image array. At step 160 the gap pixels are determined and an example of gap pixels in a page image, set to black for purposes of illustration, is shown in FIG. 12. The total number of gap pixels associated with a text group g is referred to as the gap area of g and is determined at step 162. Similarly, the total number of black pixels (of text blocks therein) of g is called the block area of g (determined at step 164). The second constraint is then applied at step 166 by comparing the gap area of g against the block area of g, in the form of a ratio, and comparing the ratio to a threshold T2. The value for T2 is preferably determined empirically and may be determined independently or adjusted for different image sample sets representing known types of documents in which running text is to be identified.

Although the process steps of flowchart 4, through step 166, are designed to identify the running and non-running text regions, the text groups of non-running text identified therein are not necessarily complete units. More likely, the text groups of non-running text are individual fragments of larger non-running text regions. For example, consider what appears to be a table region in the lower left corner of the page image in FIG. 5. As illustrated in FIGS. 9, 10 and 11, this region is broken into many small text groups because the text blocks vary in size. Accordingly, further processing is necessary in order to accurately classify the non-running text regions.

Continuing with FIG. 4, there are three main steps in the recombination of the fragmented, non-running text groups. First, contiguous regions of non-running text blocks are defined based upon Voronoi adjacency. These regions will be hereafter referred to as raw non-running text regions. It should be noted that alternative criteria may be employed to define contiguous regions, and it will be further appreciated that the criterion employed is not necessarily raster-based. Second, the raw non-running text regions are split vertically by extending the running text blocks horizontally. Broadly speaking, a page layout is a set of text units (e.g., paragraphs, tables, etc.) stacked from the top of the page to the bottom. Typically, two text units are related only if they are adjacent in this top-bottom sequence. As an example, in the sequence a, b, c, . . . where a and c are non-running text regions and b is a running text region, a should not be merged with c. However, the first step may do just that in certain cases because the Voronoi criterion indicates long-range neighbor relationships. Accordingly, the relatedness constraint on a, b, and c is employed to correct for this and the result is that a and c are split (not merged). Finally, any running text regions that are almost wholly nested within non-running text regions are merged into the nesting regions. In particular, the use of the Voronoi adjacency criterion in the first step may tend to "over merge" in some situations and the second step is intended to counteract such a tendency. Similarly, headings and captions belong to non-running text regions, but may have been incorrectly labeled as running text in the partitioning operation and the last step is meant to correct for this overinclusiveness.

Figure 13A:
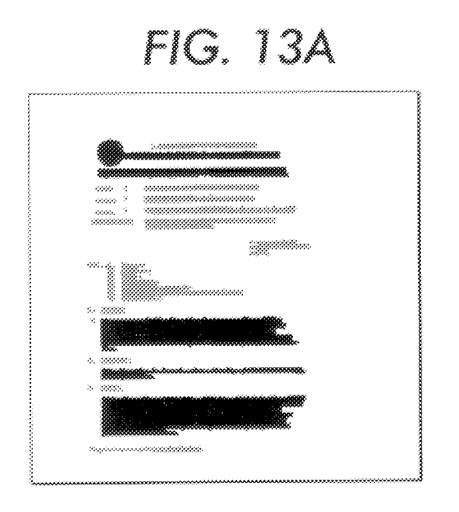
FIGS. 13A–13D are illustrative examples of resultant images processed by the classification operation of FIG. 2 and in accordance with the techniques employed in the present invention.
Figure 13B:
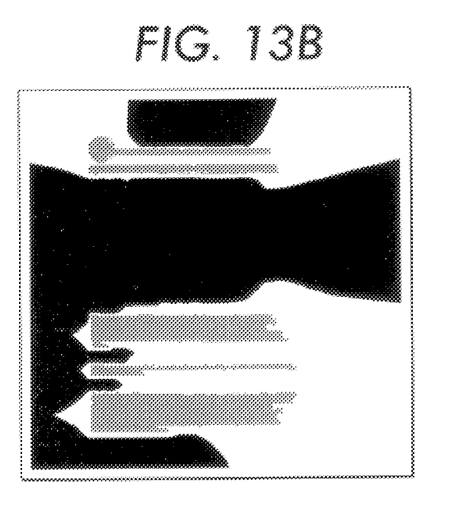
Figure 13C:
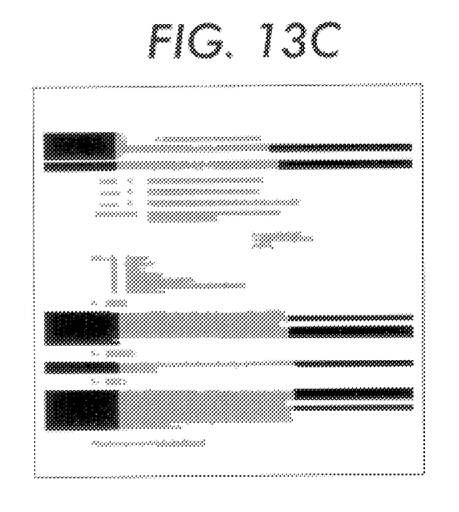
Figure 13D:
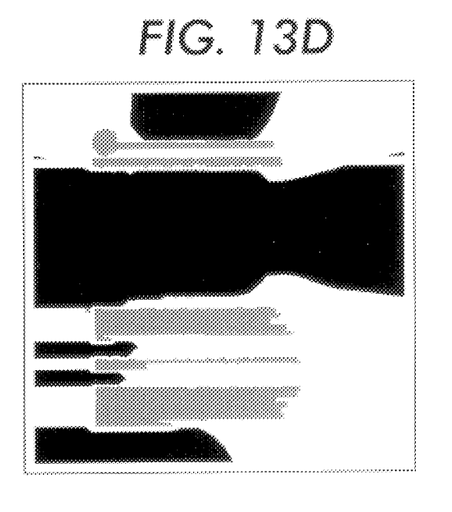

More specifically, step 170 starts by representing the raw, non-running text regions as a binary array N, where each connected component in N encompasses a set of non-running text blocks that are Voronoi neighbors. A pixel is set to "1" in N if it is nearer a pixel of a non-running text block than it is to any pixel of a running text block. At step 172, as described above, the running text blocks that are Voronoi adjacent to the left and/or right border of the page image (those groups whose Voronoi regions include part of the image border) are extended to the adjacent border and the resulting array is subtracted from N. Examples of this step are illustrated in FIGS. 13A–13D. In particular, FIG. 13A illustrates in black the running text blocks of an image processed in accordance with step 166 of FIG. 4. FIG. 13B illustrates the over-merging associated with Voronoi adjacency, where it can be seen along the left margin of the page image that the non-running text blocks have been combined into what are two large text groups in accordance with step 170. However, FIGS. 13C and 13D respectively illustrate the extension of the running text regions to the borders of the page image and the resultant splitting of the non-running Voronoi group into a plurality of smaller non-running text groups.

Continuing with the flowchart of FIG. 4, having split apart the separate non-running text regions into appropriate groups, step 174 merges any raw running text region, a, that is almost wholly nested in some raw non-running text region b. In practice, this is accomplished by simply complementing a. In order to determine if the running text is sufficiently nested to warrant inclusion into the non-running text group, the measure employed is based upon the fraction of the perimeter of region a that is adjacent to region b. In other words, only when the perimeter of region a is sufficiently in contact with a single non-running region b will a be deemed almost wholly nested and merged into b. Again, the fraction at which the groups are to be merged is determined empirically and is preferably 75%. Below this level, the running and non-running text blocks are maintained as separate groups. In a preferred embodiment, the splitting and merging operations described with respect to steps 170, 172 and 174 are done in the binary array N which is created in memory accessible by the processor, and N then defines the required partitioning of the image after step 174 is completed; where black regions (1's) in N are the non-running text regions and white regions (0's) are the running text regions. Alternatively, the array N can be analyzed and the running and non-running text regions delimited by boundaries, for example rectangular boundaries, so that a data record may be employed to represent the two types of regions in the partitioned page image.

In a preferred embodiment, the present invention is employed to partition a page image so as to identify non-running text regions therein. Once identified, the non-running regions are further analyzed so as to make a determination as to whether the non-running text region comprises text in a tabular format. Details of such an analysis are found in copending Application Ser. No. 08/565,181, filed by J. Mahoney concurrently herewith and previously incorporated by reference.

In recapitulation, the present invention is a method and apparatus for analyzing image data, and more particularly for analyzing of image data representing images containing text to partition the image into running and non-running text regions therein. The present invention utilizes characteristics of running text regions to identify such regions and to subsequently group all non-running text regions into related groups. First text blocks are formed to identify text regions at the paragraph level in the page image. Next, similar width text blocks are associated as sets to form text groups. Once text groups are identified, an optional streak filter (height mask) may be applied to eliminate is horizontal streaks. Subsequently, the running text is identified using two "filtering" operations; the first comparing page contracted width to the contracted width of each group, and the second comparing the gap area to the text block area. The outcome is an identification of the running text regions, and the remaining groups are generally characterized as non-running text regions. Subsequently, the non-running text regions are first formed into contiguous regions using a Voronoi adjacency analysis, split by horizontally extending running text regions (blocks), and merged with any running text regions that are almost wholly nested therein.

It is, therefore, apparent that there has been provided, in accordance with the present invention, a method and apparatus for analyzing page image data, and more particularly to partitioning a page image into running and non-running text region. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method comprising:

retrieving an input image, the image comprising an array of image signals and associated data defining a set of boundaries of a plurality of text-blocks represented therein, and storing the array of image signals in a bitmap array and the data defining the set of boundaries in a second array;

partitioning the text-blocks defined by the set of boundaries stored in the second array into text groups, wherein the partitioning step further comprises the steps of, applying a similarity grouping criterion to the text-blocks to identify a stable number of text groups in the input image, wherein the similarity grouping criterion is a sufficient stability criterion that is based upon the width of the text blocks along a raste,r and dividing the input image into the stable number of text groups; and classifying the text-groups to determine those text-groups which represent running text regions of the image and those which represent non-running text regions of the image.

2. The method of claim 1, wherein the partitioning step further comprises the step of enforcing spatial contiguity between the text-blocks assigned to each one of the stable number of text groups.

3. The method of claim 1, wherein the stable number of text groups is determined in accordance with a method comprising the steps of:

obtaining data defining a third array, the array comprising values wherein each value in the third array represents a text-block width;

using the third array of values to obtain difference data, the difference data representing any difference in the values represented in the third array, and storing the difference data in the fourth array as values;

using the difference data stored in the fourth array, determining a similarity threshold $\tau$, where $\tau$ is equal to the first value for which a predefined in incremental change does not affect the number of groups; and applying the similarity threshold to the difference data of the fourth array to group the text blocks according to a similarity in the width of the text blocks.

4. The method of claim 1, wherein the partitioning step comprises the steps of:

applying a unique label to each text group;

evaluating an adjacency criterion for each pixel in the image;

based upon the determined adjacency criterion, determining new boundaries between different regions in the image; and regrouping a text block in at least one group in accordance with the new boundaries.

5. A method comprising:

retrieving an input image, the image comprising an array of image signals and associated data defining a set of boundaries of a plurality of text-blocks represented therein, and storing the array of image signals in a bitmap array and the data defining the set of boundaries in a second array;

partitioning the text-blocks defined by the set of boundaries stored in the second array into text groups; and classifying the text-groups to determine those text-groups which represent running text regions of the image and those which represent non-running text regions of the image, wherein the step of classifying the text groups further comprises the steps of, (a) classifying those text groups having a group-width to page-width ratio greater than a first threshold as running text and all other groups as non-running text, (b) identifying the text groups according to the classification in step (a), (c) classifying the remaining running text groups having a gap-area to block-area ratio greater than a second threshold as running text and all other remaining running text groups as non-running text, and (d) identifying the groups according to the classifications of step (a) and step (c).

6. The method of claim 5, wherein the step of classifying the text groups further comprises the steps of:

defining non-running text groups based upon an adjacency criterion;

splitting a first text group by extending the horizontal extent of an adjacent running text group so as to form at least two non-running text groups from the first text group; and merging running text groups that are at least partially nested into non-running text groups adjacent thereto.

7. A method operating on a programmable computer for partitioning a an image containing text into regions of running text and non-running text, the image consisting essentially of an array of image signals and associated data defining a set of boundaries of a plurality of text-blocks represented therein, said method comprising the steps of:

retrieving an input image and storing image signals thereof in a first bitmap array memory location and the data defining the set of boundaries in a second memory location;

partitioning the text-blocks defined by the boundaries stored in the second memory location into text groups wherein the partitioning step further comprises the steps of applying a similarity grouping criterion to the text-blocks to identify a stable number of text groups, wherein the similarity grouping criterion is a sufficient stability criterion that is based upon a dimension of the text blocks, and dividing the input image into the stable number of text groups; and classifying the text groups to determine those text groups which represent running text regions of the image and those which represent non-running text regions of the image.

8. The method of claim 7, wherein the partitioning step further comprises the step of enforcing spatial contiguity between the text-blocks assigned to each one of the stable number of text groups.

9. The method of claim 7, wherein the stable number of groups is determined in accordance with a method comprising the steps of:

obtaining data defining an initial array of values, each value representing a text-block width;

using the initial array of values to obtain difference data for a second array, said second array having values stored therein representing the difference in the values represented in the initial array;

using the difference data stored in the second array, determining a similarity threshold $\tau$, where $\tau$ is equal to the first value for which a predefined incremental change does not affect the number of groups; and applying the similarity threshold to the difference data of the second array to group the text blocks according to similarity in the width of the text blocks.

10. The method of claim 7, wherein the partitioning step comprises the steps of:

applying a unique label to each text group;

evaluating an adjacency criterion for each pixel in the image;

based upon the determined adjacency criterion, determining new boundaries between different regions in the image; and regrouping a text block in at least one group in accordance with the new boundaries.

11. A method operating on a programmable computer for partitioning an image containing text into regions of running text and non-running text, the image consisting essentially of an array of image signals and associated data defining a set of boundaries of a plurality of text-blocks represented therein, said method comprising the steps of:

retrieving an input image and storing image signals thereof in a first bitmap array memory location and the data defining the set of boundaries in a second memory location;

partitioning the text-blocks defined by the boundaries stored in the second memory location into text groups; and classifying the text groups to determine those text groups which represent running text regions of the image and those which represent non-running text regions of the image wherein the step of classifying the text groups further comprises the substeps of (a) classifying those text groups having a group-width to page-width ratio greater than a first threshold as running text and all other groups as non-running text, (b) identifying the text groups according to the classification in step (a), (c) classifying the remaining running text groups having a gap-area to block-area ratio greater than a second threshold as running text and all other groups as non-running text, and (d) identifying the groups according to the classifications of substep (a) and substep (c).

12. The method of claim 11, wherein the step of classifying the text groups further comprises the steps of:

defining non-running text groups based upon an adjacency criterion;

splitting a first text group by extending the horizontal extent of an adjacent running text group so as to form at least two non-running text groups from the first text group; and merging running text groups that are at least partially nested into non-running text groups adjacent thereto.

13. An apparatus, comprising:

a first memory for storing image data;

a second memory for storing data representing characteristics of an image, the bitmap data for said image being stored in said first memory array;

instruction memory;

a text processor, connected to said first and second memory and said instruction memory for accessing the data stored in the first and second memory in accordance with instructions stored in said instruction memory, the processor in executing the instructions:

accessing the image data stored in the first memory location to produce text block boundaries representing text blocks in the image, the data defining the text block boundaries being stored in the second memory as image characteristic data;

partitioning the text-blocks defined by the boundaries stored in the second memory location into text groups; and classifying the text-groups to determine those text-groups which represent running text regions of the image and those which represent non-running text regions of the image, wherein the text processor, operating in accordance with a partitioning instruction, applies a similarity grouping criterion to the text blocks to identify a stable number of text groups in the input image stored in said first memory, wherein the similarity grouping criterion is a sufficient stability criterion that is based upon a dimension of the text blocks, and divides the input image into the stable number of text groups, wherein data characterizing boundaries of the text groups is stored in said second memory.

14. The apparatus of claim 13, wherein the similarity grouping criterion is stored in said instruction memory as code representing a sufficient stability criterion that is based upon a width of the text blocks along a raster direction.

* * * * *